C. LEAK.
SHOCKER ATTACHMENT FOR BINDERS.
APPLICATION FILED MAR. 6, 1913.

1,116,449.

Patented Nov. 10, 1914.

UNITED STATES PATENT OFFICE.

CLARENCE LEAK, OF BRUCEVILLE, INDIANA.

SHOCKER ATTACHMENT FOR BINDERS.

1,116,449.  Specification of Letters Patent.  Patented Nov. 10, 1914.

Application filed March 6, 1913. Serial No. 752,463.

*To all whom it may concern:*

Be it known that I, CLARENCE LEAK, a citizen of the United States, residing at Bruceville, in the county of Knox and State of Indiana, have invented a new and useful Improvement in Shocker Attachments for Binders, of which the following is a specification.

This invention relates to a grain shocker adapted to be attached to the ordinary binder.

The object of the invention is to assemble the bundles received from the binder into a shock of the ordinary size and shape, to tie the said shock and to then deposit it upon the ground, these operations being performed partly automatically, and in part under the influence of certain foot pedals mounted upon the binder and under the direct control of the operator.

The invention consists of the novel features of construction hereinafter described, pointed out in the claims and shown in the accompanying drawings, in which, Fig. 6ª is a section on the line 6ª—6ª of Fig. 6. Fig. 9ª is a section on the line 9ª—9ª of Fig. 9.

In these drawings, 1 represents the frame of a binder or harvester to which the attachment is to be secured.

2 represents the frame of the attachment. This frame carries a shocker box comprising a floor 3 and the frame is connected to the harvester or binder by means of suitable braces 4. Carried by the frame and forming a portion of the shocker box are crescent shaped sides 5, sloping inwardly and upwardly, the shock being formed upon the floor 3 and between the said sides. The frame is of course supported upon one side by the braces 4 and upon the opposite side it is supported by a suitable ground and drive wheel 6, said wheel being mounted upon a shaft 7. Upon the said shaft is a large sprocket wheel 8 over which runs a sprocket chain 8ª. Upon a suitable shaft 10 arranged transversely across one-half of the front of the frame is arranged a sprocket wheel 9, over which the chain 8ª also runs, and it will be understood that the wheel 6 is fixed upon the shaft 7 and through rotation of the shaft 7 the sprocket wheel 8 is rotated and the chain 8ª drives the sprocket wheel 9, which in turn is fixed upon the shaft 10. There is also mounted upon the shaft 7 a gear wheel 11. A vertically arranged shaft 12 carries a loosely mounted gear 13, which meshes with the gear 11 fixed upon the shaft 7. To prevent dirt, dust and loose grain or chaff from clogging the said gears I provide a suitable shield or housing 14, which also serves as a bearing for the vertical shaft 12, and said housing also supports suitable braces 15 and 16. The shaft 12 also passes loosely through a collar 17 supported at the upper outer end of a suitable brace rod 18. The gear 13 carries a clutch member 19 and there is keyed to the shaft 12 a slidable coöperating clutch member 20 said clutch member 20 having an annular groove 21 engaged by a shoe 22. To said shoe 22 is pivotally connected one end of a link 23 and a spring 23ª has one end connected to the link and the opposite end is connected to a suitable bracket 23ᵇ. The tendency of this spring is to normally hold the link 23 in elevated position, thereby holding the clutch member 20 out of engagement with the co-acting member 19 of the gear 13. A suitable collar 24 is secured, preferably by a set screw, to the shaft 12 and said collar is provided with teeth 25, each having one vertical and one beveled edge. A suitable bracket 27 is carried by the collar 17, said bracket having perforated horizonally extending lugs through which work vertically an angled rod 26, the upper angled end portion of which projects over the collar 24 and is adapted to be engaged by the beveled edges of the teeth 25. It will therefore be obvious that said rod will be lifted by said teeth twice upon each rotation of the shaft 12. The lower end of said rod carries an outwardly extending pin 22ª which pin is adapted to rest upon the upper angled end portion of a tripping lever 29, said lever being pivotally connected to the frame 2 as indicated at 30.

The floor 3 consists of two sections fixed on rotatable rods 85ª, which carry bell cranks 32. Toothed segments 31 are pivotally mounted on stub shafts 85 carried by the end of the frame 2. Locking rods 33 connect the segments 31 respectively to the bell cranks 32 and as the segments 31 mesh with each other both the leaf sections of the shocker floor will move together. One of the toothed segments 31 carries a locking arm 34, which arm extends through a suitable slot 2ᵇ, produced in one of the side members 2 of the frame and the outer end portion of the arm 34 is provided with a lug 34ª which normally engages the outer side of the frame and prevents inward movement of the arm 34. The extreme outer end portion of the arm 34 passes transversely across the lower end portion of the tripping lever 29, and is engaged by said lever. Coil springs 35 are secured to the ends of the bell cranks 32, opposite the ends to which the rods 33 are pivoted, said springs being of sufficient strength to lift the floor sections into closed position, after the dropping of the shock, and also yieldingly resisting opening movement of said sections. It will be obvious that by reason of the intermeshing teeth of the segments 31 the floor sections cannot fall until the arm 34 has been released by the lever 29 lifting its outer end so that the lug 34ª will clear the slot 2ᵇ.

Figures 5, 6, 6A:
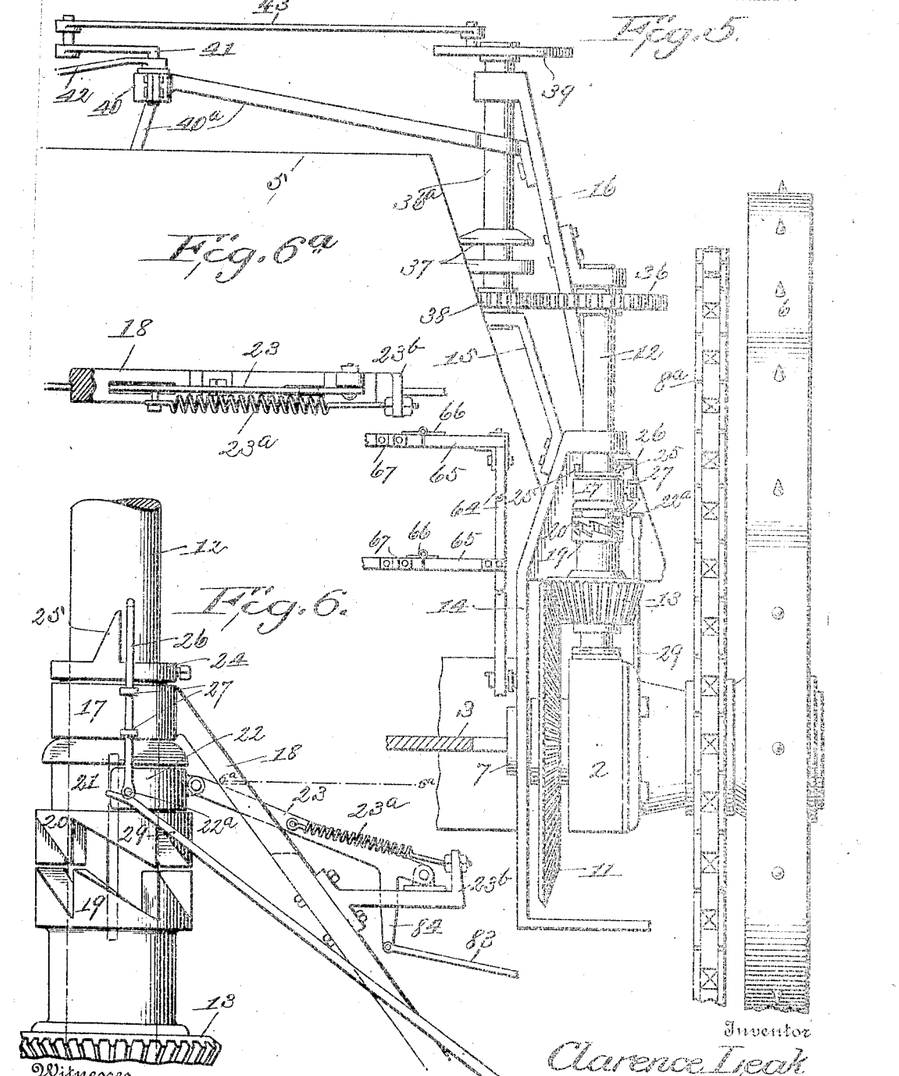
Fig. 5 is an enlarged detail end view of the driving gear.
Fig. 6 is an enlarged detail view of a clutch mechanism shown in Fig. 5.
Figures 7, 8, 9, 9A, 10:
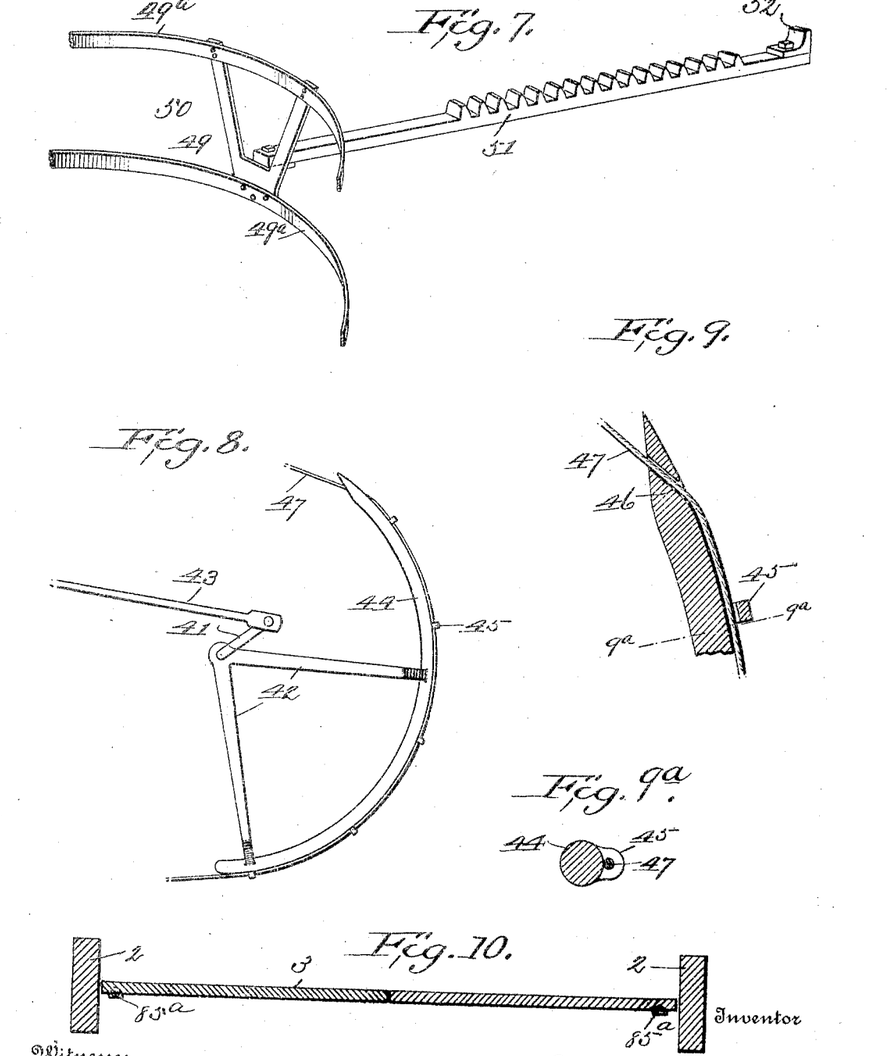
Fig. 7 is a detail perspective view of a bundle rest or assembler.
Fig. 8 is a plan view of a needle, its supporting arms and a portion of the operating rod.
Fig. 9 is an enlarged detail longitudinal section through the needle point.
Fig. 10 is a cross section through the floor of the shocker.
Figure 11:
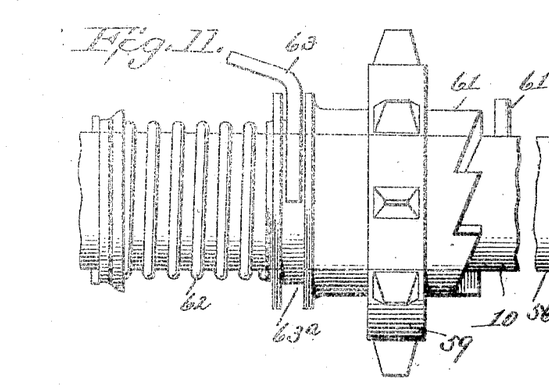
Fig. 11 is a detail view of a spring pressed clutch.
Figure 12:
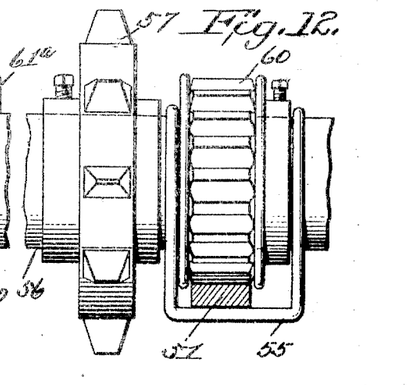
Fig. 12 is a detail view of certain operating mechanism, a portion of the bundle rest being shown in section.

Referring more especially to Fig. 5, it will be noted that the shaft 12 carries adjacent its upper end a gear wheel 36. Adjacent and parallel to said shaft is a shaft 36ª, said shaft being journaled in bearings formed at the upper ends of the braces 15 and 16. A suitable knotting device 37 of the usual type is carried by the shaft 36ª and this shaft is also provided with a small gear wheel 38 which meshes with the larger gear wheel 36. On the upper end of the shaft 36ª is a disk 39. A needle arm bearing 40 is supported by suitable braces 40ª, and carries a cranked needle arm shaft 41 connected to the disk 39 by a suitable connecting rod 43. A bifurcated needle arm 42 supports a curved needle 44, the construction of which is shown in Figs. 8, 9 and 9ª.

The members of the needle arm diverge from each other and are angled downwardly over the sides 5 of the shocker box, being connected to the needle at almost 90 degrees apart. The outer curved face of the needle is provided with loops 45, and the point of the needle is provided with an oblong bore or eye 46, and a suitable twine 47 runs through the loops 45 and through said eye 46, said twine running from a twine box 48, carried by the side 5 of the shocker. A bundle rest 49 shown complete in Fig. 7 comprises a vertically arranged V-shaped brace or bracket provided at its upper and lower ends with curved horizontally arranged arms 49ª adapted to partly encircle the shock. The lower of these arms is of greater length than the upper one, being intended to partly inclose and form the lower end of the shock while the upper arm embraces the shock midway its ends. Extending forwardly from the frame 50 is a rack rod 51 which works loosely through an opening 53 in the front end of the side 5 of the shocker box, being provided at its extreme end with a suitable stop 52, adapted to prevent the outer end of the rack from passing through the side 5.

Figure 2:
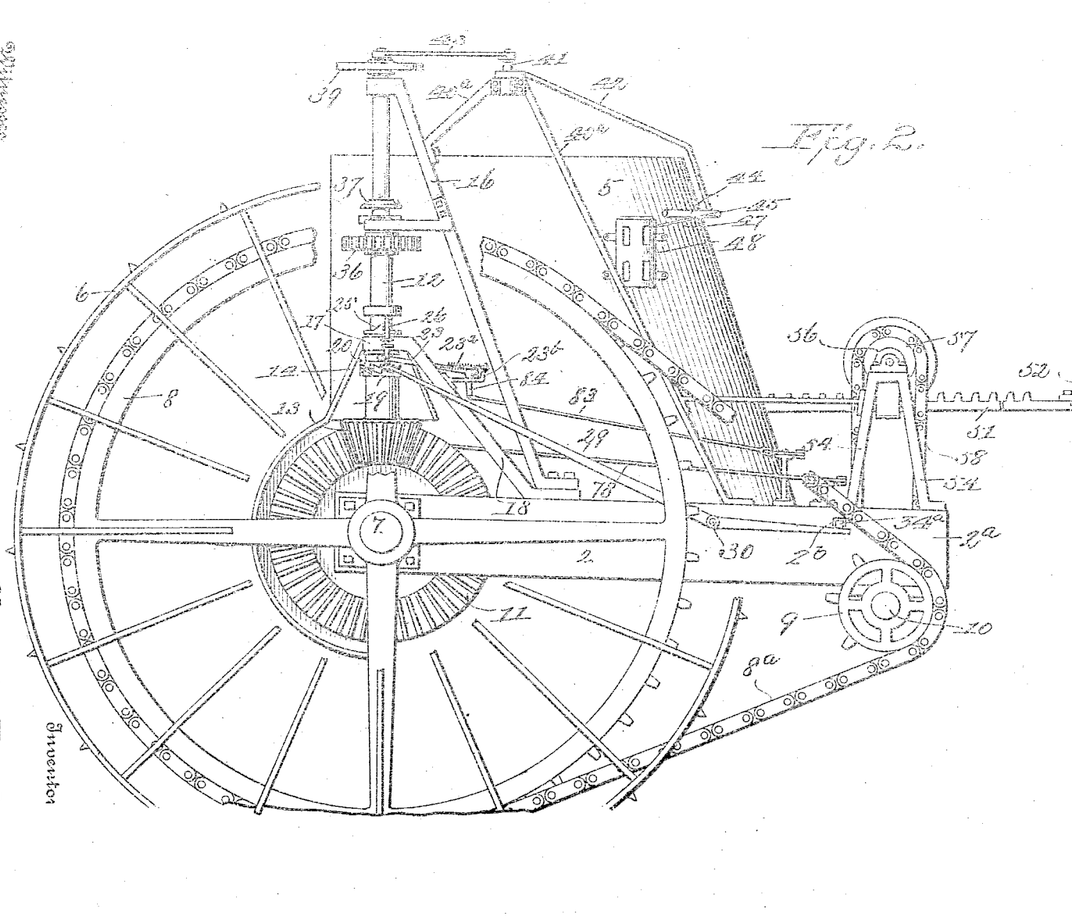
Fig. 2 is a side elevation of the shocker.
Figure 3:
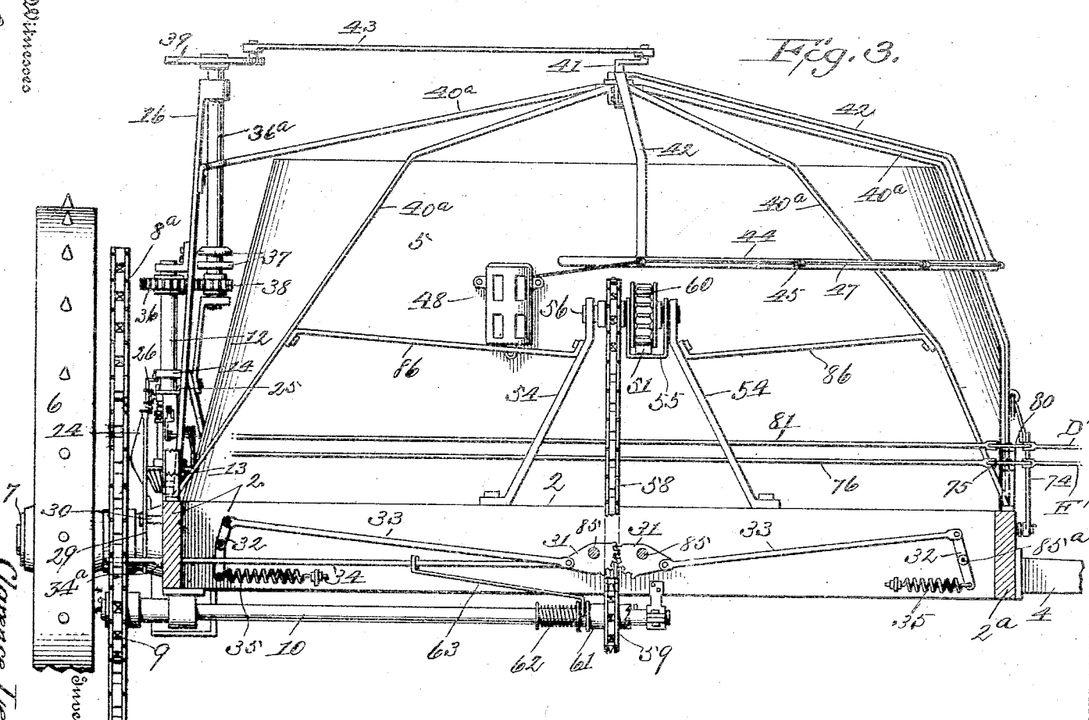
Fig. 3 is a front view of the shocker.
Figure 4:
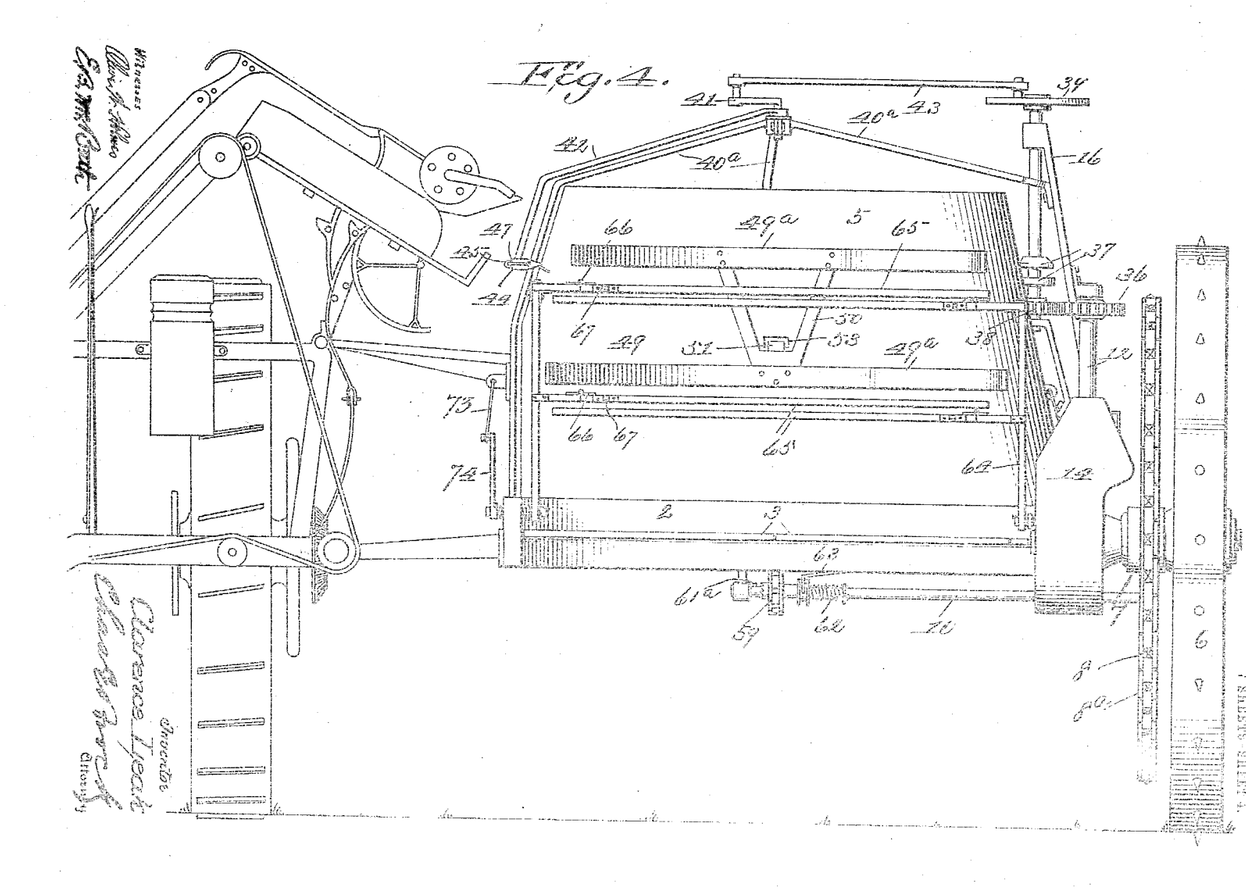
Fig. 4 is a rear view of the shocker with the sheaf receiving arms in raised position, a portion of the binder being shown in outline.

Referring to Figs. 2 and 3, it will be noted that the frame 2 carries suitable braces 54 which form a support for the rack bar. A suitable hanger 55 is hung on a shaft 56, the ends of which are journaled in the upper ends of the braces 54, and the bar 51 slidably rests in said hanger. A sprocket wheel 57 is fixed upon the shaft 56 and a sprocket chain 58 runs from said sprocket wheel over a sprocket wheel 59 loosely mounted upon the shaft 10. On the shaft 56 is also fixed a cog wheel 60, which meshes with the rack bar 51. The sprocket wheel 59 carries a clutch member 61 the teeth of which are adapted to be forced into engagement with the pins 61ª carried by the shaft 10. A spring 62 normally tends to force said clutch into engagement with said pins, and a suitable shoe and connecting rod 63 engages an annular groove 63ª formed upon the clutch 61 and normally holds the same out of engagement with the pins 61ª. The clutch rod 63 is connected with the rod 34.

As will hereafter appear the operation of all of the above mentioned parts depends upon the operation of the clutches 19 and 20 previously referred to.

To deliver the bundles to the shocker box, I employ suitable bundle carriers which consist of parallel pivoted bars 64, said bars extending rearwardly from the rear ends of the open frame 2. Each of these bars carries two inwardly extending arms 65, the arms of one bar overlapping those of the other. Each arm is hinged as shown at 66, adapting it to swing in a horizontal plane, and as shown at 67 is adapted to swing in a vertical plane and the bars 64 are also adapted to swing in a vertical plane, the arms 65 swinging at right angles to the movement permitted to bars 64. If the arms 65 were rigid as the completed shock passed out of the shocker it would catch upon said arms and turn over, but this is avoided by use of the hinges 66 which allow the arms to be forced backward and upward by the shock. The hinges 67 allow one pair of arms 65 to pass a succeeding bundle that is being delivered by the other pair of arms 65. To operate the bundle carriers and other parts above referred to I provide upon the harvester foot pedals A, B and C.

Figures 13, 14, 15:
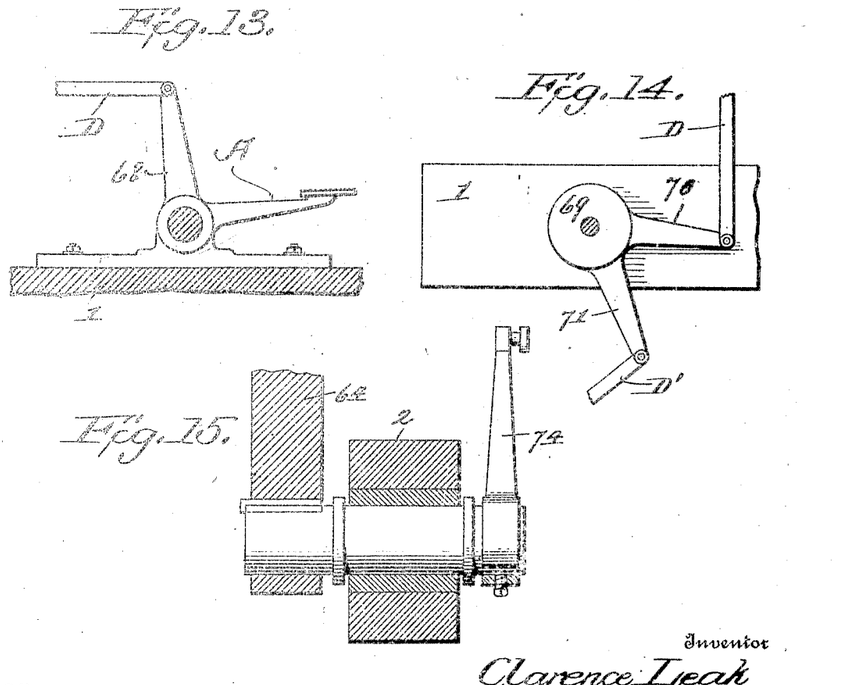
Fig. 13 is a detail sectional view illustrating a foot pedal.
Fig. 14 is a detail view partly in section, illustrating the manner of connecting certain operating rods.
Fig. 15 is an enlarged detail sectional view illustrating the manner of pivoting certain bundle carrying arms.

Referring to Fig. 13, in which one of said foot pedals is illustrated, it will be noted that it consists of a bell crank 68, one arm of which is adapted to be depressed by the foot and to the other arm is pivotally connected a suitable connecting rod. These rods are shown at D, E, and F and are connected respectively to the foot pedals A, B and C. Arranged in alinement with the foot pedals and also upon the harvester frame are disks 69, one of which is shown in Fig. 14. This disk is provided with diverging arms 70 and 71, and in said figure I have shown the arm 70 pivotally connected to the connecting rod D. The arms 70 of the other disks are pivotally connected to the rods E and F. It will be understood that these rods may be formed of suitable pieces of wire, as well as small flat brass. Running from the respective arms 71 of the disks 69 are connecting wires D', E' and F'.

Connecting wire E' runs to a bell crank 72 which is connected by a wire 73 with an angled lever 74 secured upon the pivot of the arm 64 adjacent the harvester frame 1. The wire F' is connected to one member of a bell crank 75 to the other arm of which is secured a wire 76 running to a bell crank 77 upon the outer side of the frame 2 and the wire 78 runs from the bell crank 77 to a lever 79 mounted upon the pivot pin of the outer bar 64. The connecting wire D' which is connected through the wire D to the foot pedal A runs to a bell crank 80, to which is connected a wire 81 running to a bell crank 82 from which runs a wire 83, and as will be seen from Fig. 2 the wire 83 is secured to a depending finger 84 carried by the pivoted link 23 and it will therefore be obvious that depression of the foot pedal A will draw down said link 23 through the connections just described and will force the member 20 into engagement with the coöperating member 19.

It will be obvious that in the construction involving as many various parts as a device of this kind there are necessarily a number of details the exact construction of which are of minor importance. Various changes can therefore be made in the manner of locating and securing the various parts, without in any way changing the operation of the machine or departing from my invention. The floor sections 3 for example are shown as being mounted upon rotatable rods 85$^a$, which rods pass through an end of the frame 2 and extend across an end extension 2$^a$ of the frame 2, the said extension forming a box-like member within which the operating rods 33 and 34 and connected parts are arranged. The bell cranks 32 are of course rigidly fixed upon rods 85$^a$. It is of course obvious that said rods could be cut off and this extension omitted if it was desired to lighten or cheapen the construction. I have also provided braces 86 which run from two of the brace rods 40$^a$ to opposite sides of the bracket 54, thereby laterally bracing said bracket. It will of course be obvious that the braces may be placed anywhere in the structure that it may be found necessary or convenient to locate them. It will also be noted that in Fig. 1 the construction has been shown in a more or less diagrammatic manner for the purpose of enabling the connection between the various parts to be traced, and consequently in said figure a large number of parts have been omitted, and other parts so placed and arranged as to most clearly show the manner of operation.

As has been previously stated depression of the foot lever A will draw the clutch 20 downwardly into engagement with the clutch 19, thus locking the vertical shaft 12 to the gear 13 and through the gears 36 and 38 rotating the shaft 36$^a$, the knotting device and the disk 39, rotation of the disk 39 through the connecting members 43, 41 and 42 imparting the proper swinging movement to the needle 44.

At the same time the downward movement of the clutch 20 causes the pin 22$^a$ carried by the shoe 22 to engage the upper end of the lever 29, said pin also passing through the angled rod 26. The downward movement of the tripping lever 29 will rock said lever upon its pivot pin 30 thereby lifting upwardly the outer end of the rod 34 and releasing the lug 34$^a$ from engagement with the side of the frame 2, thereby permitting the weight of the shock to force the door sections open, the segments 31 being now free to rotate upon the rods 85, this downward movement of the floor section of course stretching the springs 35. As the bell cranks 32 are rigidly secured to the rods 85$^a$ the downward movement of the floor sections will of course be accompanied by the rocking of said cranks, partial rotation of the segments 31, longitudinal movement inwardly of the rods 33, and an inward movement of the locking arm 34. This last mentioned movement carries with it the rod 63 which forces the clutch 61 into engagement with the pin 61ª, thereby locking the sprocket wheel 59 and the shaft 10. This actuates the cog wheel 60 thereby moving the rack bar 51 of the bundle rest 49. But in the meantime the needle operating mechanism has also been set into action by engagement of the clutch members 19 and 20 and the needle movement is much more rapid than the movements of the parts immediately above described, especially as the springs 35 resist the dropping of the floor sections and furthermore it will be noted from Fig. 2 that there is a slight downward motion of the rack bar 51 of the bundle rest, and the bundle rest therefore not only compresses the shock but by reason of the slight inclination of the rack bar 51 exerts a downward pressure upon it, such pressure increasing as the shock becomes compact. Owing to the fact therefore that the movement of the various parts employed for the purpose of permitting the shock to drop are more or less retarded and are comparatively slow as compared with the quick action of the needle the shock is tied before the floor sections have opened to a sufficient extent to permit the shock to drop.

Figure 1:
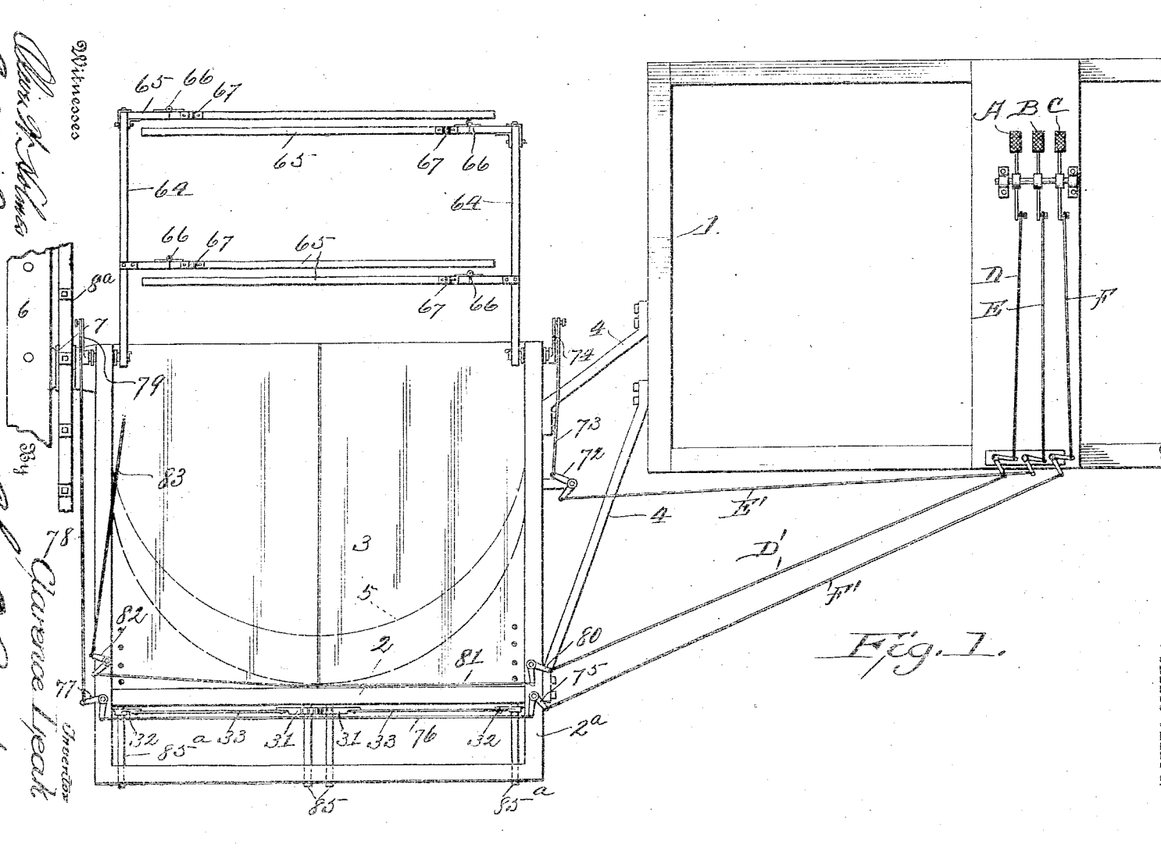
Figure 1 is a plan view, the sides of the shocker being removed and indicated by dotted lines, and parts being broken away.

The bundle carrier arms 64 and 65 are operated independently of the other parts, and are also capable of operation independently of each other, their movements being controlled by the foot levers B and C as shown diagrammatically in Fig. 1 and through the connections previously traced out. It will be obvious therefore that while all of the operation of assembling the bundles into the shock, tying and dropping the shock are under direct control of the operator a portion of the work is performed automatically thus relieving the operator of a considerable portion of the work.

What I claim is:

1. A shocker adapted to be supported from one side of a harvester, said shocker comprising a sectional hinged floor, a shock engaging member adapted to move longitudinally along said floor, bundle carriers pivotally mounted at the forward end of said flooring, said carriers comprising sectional arms hinged to swing in two different directions, and means operated from the harvester for swinging said bundle carriers and also for setting the shock engaging member in motion.

2. In a shocker adapted to be attached to a harvester, a shock engaging device comprising semi-circular members and a rack bar, a cog wheel meshing with said rack bar, a drive mechanism including a clutch, means operated from the harvester for throwing said clutch to operative position, a binding mechanism controlled by movement of said clutch, a second clutch controlling rotation of the said cog wheel, a tripping lever regulating movement of the second mentioned clutch, and a pin carried by a portion of the first mentioned clutch mechanism and adapted to engage said tripping lever, and means for throwing the first mentioned clutch out of gear at a predetermined time.

3. A device of the kind described comprising a shocker having a sectional hinged floor normally locked in horizontal position, hinged bundle carrying arms, a movable shock engaging member, and a bundle tying device comprising a curved needle, a drive shaft, a movable clutch member thereon, means for throwing said clutch into operative position, said means being carried upon the harvester, and means for automatically throwing said clutch into inoperative position upon a partial rotation of the drive shaft, and means whereby movement of said clutch into operative position unlocks said flooring, imparts movement to said needle, and also moves the shock engaging member, as and for the purpose set forth.

4. A device of the kind described comprising a shocker having a sectional hinged floor, rods pivotally mounted to swing in a vertical plane above said floor, overlapping arms carried by said rods, each of said arms being formed of two sections hinged to swing at right angles to each other, means mounted upon a harvester for swinging said rods independently of each other, a shock engaging member adapted to traverse said floor toward and away from said arms, and means for controlling movement of said member.

5. A device of the kind described comprising a shocker frame, a hinged floor carried by said frame, means for locking said floor against downward movement, means for delivering bundles to said floor, a shock engaging member, a curved needle, said needle having a plurality of eyes, formed upon its outer curved face, and having an oblique eye formed adjacent its point, a twine running through said eyes and common means for imparting a swinging motion to said needle, a horizontal movement to said shock engaging member and releasing said floor sections and means for automatically returning said parts to normal position.

6. In a device of the kind described, a shocker frame, a rotatable shaft, a supporting wheel fixed upon said shaft, a bevel gear wheel fixed thereon, a vertical shaft, a bevel gear wheel upon the vertical shaft, said gear wheel meshing with the first mentioned gear, a clutch, one member of which is secured to the last mentioned gear, and the other member of which is keyed to the vertical shaft, a sectional hinged flooring the floor sections being mounted upon rotatable shafts, bell cranks carried by said shafts, intermeshing segments carried by stub shafts, means connecting said bell cranks to said segments, springs connected to the bell cranks for returning the same to normal position, a trip lever, a shoe for actuating the clutch member keyed upon the shaft, and a pin carried by said shoe and adapted to engage said trip lever, said lever when actuated unlocking said segments.

7. A shocker and bundle tying attachment for harvesters comprising a frame having upwardly and inwardly sloping sides and a sectional hinged floor, means for locking the floor against downward movement, bundle carriers comprising rods hinged to said frame and sectional arms hinged to said rods, the arms of one rod overlapping those of the other, the arm sections being hinged to swing at right angles to each other, means for separately actuating said rods, a shock steadying device movable along the floor, a needle adapted to carry twine for the purpose of tying said shock, and common means for throwing said needle, and the shock steadying device into operation at the same time and for unlocking said floor sections.

8. In a shocker attachment for harvesters, a frame, a shock steadying member carried thereby, means for moving said member intermittently, pivoted arms adapted to deliver bundles to said member, a curved needle, radially extending arms supporting said needle, said arms being mounted to swing above said frame and extending downwardly over the sides of the shocker, means for swinging said needle in unison with the intermittent movement of the shock steadying member, and means for independently operating said bundle delivering arms.

9. A shocker comprising a frame, hinged floor sections, sides inclosing the side portions and rear of said floor, said sides extending upwardly and inwardly, a shock engaging device consisting of upper and lower semi-circular arms, said arms being substantially parallel to the sides of the shocker, a rearwardly extending rack bar supporting said arms and working through the rear portion of said sides, and means for delivering bundles upon said floor and into the curved arms of the shock engaging device and means for moving the same rearwardly intermittently, the said last mentioned means being started by the operator, and being automatically stopped at a predetermined time.

10. A grain shocker comprising a floor having downwardly swinging sections, intermeshing segments, bell cranks operatively connected to said floor sections, springs secured at one end to said bell cranks, and at their other ends to a fixed support, rods pivotally connected to the bell cranks, and to said segments, one of said segments carrying an arm normally locked against longitudinal movement, and a tripping lever adapted to release said arm, as and for the purpose set forth.

11. A grain shocker comprising pivoted floor sections, a bundle carrier arranged adjacent the rear end of said floor sections, said carrier comprising two vertically swinging arms, each of said arms being provided with transversely extending arms, each of said transversely extending arms being hinged to swing in two planes at right-angles to each other and at right angles to the swinging movement of the first mentioned arms.

CLARENCE LEAF

Witnesses:
THOS. R. WINEMILLER,
W. C. WITTEMMYER.